United States Patent Office 2,802,234
Patented Aug. 13, 1957

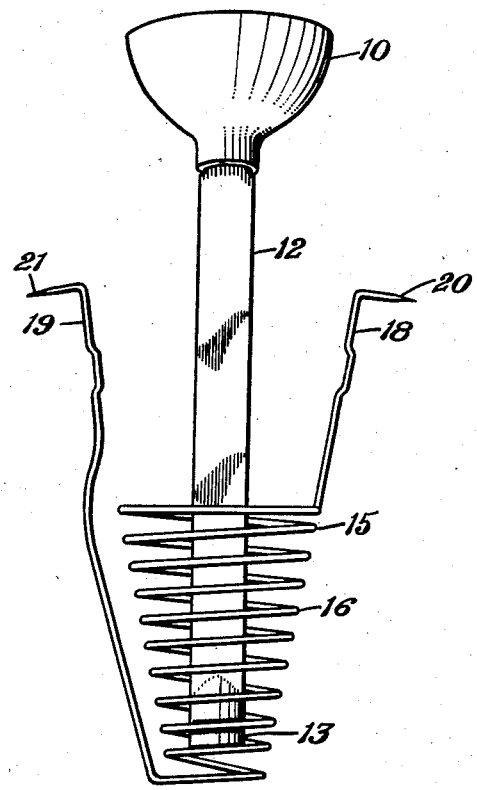
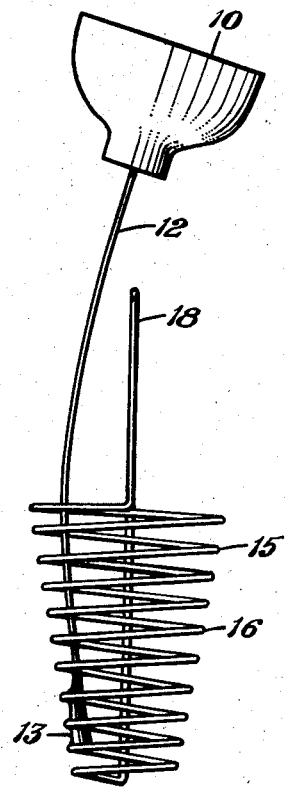
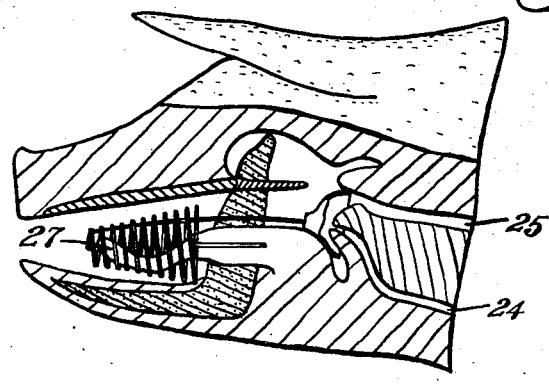

2,802,234

LARYNGEAL ORIFICE BLOCK FOR ANIMALS

John W. Cunkelman, Chicago, Ill., assignor to Swift & Company, Chicago, Ill., a corporation of Illinois Application November 3, 1955, Serial No. 544,702

5 Claims. (Cl. 17—1)

This invention relates to a device for blocking the laryngeal orifice of an animal during dressing of the animal.

The lungs of hogs are not considered edible for either man or animal, chiefly because of the manner of dressing of hogs and therefore the lungs are only used in the manufacture of tankage. In preparation for the dehairing machine, the hog carcasses are submerged in a hot water scald tank with the result that there is ingestion of tank water into the lungs of the animal. Numerous attempts have been made over the years to develop hog scald procedures which would supplant the scalding tank; however, none of these have been successful in commercial operation. Because of this intake of tank water, hog lungs have been used only for tankage without regard to whether or not a particular lung is free of pathological lesions.

With the use of the device of my invention, the scald water is prevented from entering the lungs, thus removing this objection to the use of the animal's organ. There is a scarcity of meat for use in the manufacture of dog food and the use of my device will make available for this purpose a large amount of meat which formerly was considered inedible even for animals.

My device is designed to occlude the laryngeal orifice and may be broadly described as comprising a blocking means for closing off the trachea, together with a positioning means for holding the blocking means in position within the animal's mouth. In my preferred embodiment, the blocking means is a bell-shaped member made of a flexible material such as rubber. The bell-shaped member is carried by a flexible arm which is connected to the positioning means. The device is readily inserted into animal's mouth with the use of a suitable forceps. The positioning means is spring loaded outwardly of itself, thus it is designed to engage the inner cheeks of the animal's mouth and will not damage the tongue which would occur if the positioning means were to grasp that part. The forceps are adapted to compress the positioning means inwardly to permit its insertion into the animal's mouth. With the removal of the forceps, the positioning means being spring loaded move outwardly to contact the flesh of the interior of the mouth thus locking the device into position. The device is removed subsequent to the scald tank by depressing the positioning means inwardly away from the sides of the animal's mouth.

Figure 1 is a front view of the device of the present invention.

Figure 2 is a side view of the device of Figure 1.

Figure 3 is a side view partly in section of a hog's head with the device (shown in a reduced scale) in position.

The device as illustrated in Figures 1 and 2 is made up of a bell-shaped member 10 disposed at one end of a flexible strap member 12 which strap is welded at its fixed end 13 to a positioning means 15. The bell is made of rubber or other similar material. The positioning means consists of a single piece of resilient wire wound to form a coil 16 which has the shape of a truncated cone. The wire at the opposite ends of the coil is continued to form two arms 18, 19 which extend at an angle outwardly of the coil proper. The arms terminate in flesh engaging points 20, 21 which forestall accidental dislodgment of the device when positioned in the animal's mouth. The flexible member 12 is an elongated curved flexible steel strap and as shown in Figure 3, it is positioned to overlie the tongue of the animal. The flexible strap is welded to the inside of the truncated coil adjacent its smaller end and extends from the weld along the inside of the coil to a point short of the other end of the coil where it commences to curve gently toward the coil axis at a point removed some distance from the coil. The rubber bell is fastened to the free end of the flexible strap which, in my preferred embodiment, terminates substantially on the projected axis of the coil as shown in Figure 2. The strap at the point where it terminates intersects the projected coil axis at an angle of approximately 15°. This angle permits the easy passage (as shown in Figure 3) of the rubber bell over the root of the tongue to the posterior wall of the pharynx. Channel 24 of the cross section of Figure 3 is the trachea which leads to the lungs and the upper channel 25 is the esophagus connecting the oral cavity to the stomach. The truncated wire coil serves to protect the tongue from the animal's teeth and from the dehairing beaters during dehairing of the carcass.

From my experience, the strap member 12 which connects the rubber bell to the positioning device should be flexible, thereby providing a degree of variation in the length of the device to permit its use with carcasses of different sizes, and to allow for the relative movement of the posterior wall of the pharynx and the device which may occur with the movement of the carcass in and out of the scalding tank. The flexibility of the rubber bell also assists in compensating for this relative movement and thereby assuring that the rubber bell will not pull away from the posterior wall to permit the passage of scald water into the trachea.

For hogs within the weight range of 200–275 lbs., a hollow bell with an inside diameter of approximately 2 inches and a height of 1¾ to 2 inches may be used. The curving flexible strap may have a length measured along its cord of approximately 6 to 7 inches. Minor variations in the length of the flexible strap is preferred when processing hogs weighing below 200 lbs. and over 275 lbs. The majority of animals will fall within the 200–275 lb. range. The wire coil tongue protector has a length of approximately 2½ inches.

To insert the device into the mouth of the hog carcass, forceps of the type described and illustrated in Patent No. 2,168,702, Dziedzic are used to collapse the arms 18, 19 inwardly. The operator retains a force on the collapsed device and inserts it into the mouth of the carcass. The hand pressure is released from the forceps after the rubber bell has abutted against the pharynx posterial wall. It is necessary, of course, that the wire coil encircle the tongue 27. To remove the device from the hog's mouth, the forcep is slid into the mouth in an open position and the arms 18, 19 are depressed to disengage the points 20, 21 from the flesh and the device then removed.

Obviously, many modifications and variations of the invention as hereinbefore set forth may be made without departing from the spirit and scope thereof, and therefore only such limitations should be imposed as are indicated in the appended claims.

I claim:

1. A device for use in the mouth of an animal to occlude the laryngeal orifice comprising a bell-shaped member made of flexible material and designed to close off the trachea, a positioning means having points to releasably engage portions of the mouth, and a resilient strap member fastened to said positioning means and supporting at its free end the bell-shaped member with the interior of the bell opening away from the strap.

2. A device for use in the mouth of an animal to occlude the laryngeal orifice comprising a bell-shaped member made of flexible material and designed to close off the trachea, a positioning means adapted to hold the bell-shaped member in position within the mouth, and a resilient strap member fastened to said positioning means and supporting at its free end the bell-shaped member with the interior of the bell opening away from the strap, said positioning means including two arms which terminate in flesh engaging points, said means resiliently urging said points outwardly.

3. A device for use in the mouth of an animal to occlude the laryngeal orifice, which comprises a bell-shaped member made of flexible material and adapted to close off the trachea, a tongue protector adapted to receive and to enclose a substantial portion of the free end of the tongue, a resilient strap member fastened at one end to the tongue protector and supporting at the other end the bell-shaped member with the interior of the bell opening away from the strap, and two arms associated with the tongue protector, said two arms terminating in flesh engaging points.

4. A device for use in the mouth of an animal to occlude the laryngeal orifice, comprising a blocking means of a size to cover said orifice, and a positioning means having mouth engaging portions resiliently connected to said blocking means to releasably engage the interior of the animal's mouth and hold the blocking means over said orifice.

5. A device for use in the mouth of an animal to occlude the laryngeal orifice, comprising a blocking means of a size to cover said orifice, a resilient strap having one end thereof connected to said blocking means, and a positioning means having mouth engaging portions resiliently connected to said strap adjacent the other end of the strap to releasably engage the interior of the animal's mouth and to hold the blocking means over said orifice.

References Cited in the file of this patent

UNITED STATES PATENTS

| | | |
|---|---|---|
| 2,168,708 | Hartanov | Aug. 8, 1939 |
| 2,168,712 | Lohner | Aug. 8, 1939 |

FOREIGN PATENTS

| | | |
|---|---|---|
| 16,693 | Great Britain | July 10, 1911 |
| 258,627 | Germany | Apr. 12, 1913 |